April 19, 1949.   C. G. GERHOLD ET AL   2,467,470
MANUFACTURE OF SPHERICAL PARTICLES
Filed May 25, 1945

Inventors:
Clarence G. Gerhold
Lev A. Mekler
By: Lee J. Gary
Attorney

Patented Apr. 19, 1949

2,467,470

UNITED STATES PATENT OFFICE 2,467,470

MANUFACTURE OF SPHERICAL PARTICLES

Clarence G. Gerhold, Riverside, and Lev A. Mekler, Chicago, Ill., assignors to Universal Oil Products Company, Chicago, Ill., a corporation of Delaware Application May 25, 1945, Serial No. 595,742

5 Claims. (Cl. 252—359)

This invention relates to an improved method and apparatus for the manufacture of spherical particles, particularly to types of active catalytic particles for use in accelerating and directing hydrocarbon reactions. More specifically the invention is related to an improved mixing and spraying apparatus which forms droplets or spherical particles by using a rotating disc type of sprayer or atomizer, which in turn is used in conjunction with a drying chamber.

It is an object of the present invention to provide an improved method for producing spherical particles by a direct and continuous operation, using a mixing and atomizing apparatus, and providing a stream of drying gas around the spraying zone where the droplets are formed, such that the gas stream flows with and at substantially the same rate as the droplets.

It is another object of the present invention to provide an improved form of mixing and spraying apparatus for forming particles of spherical shape.

In one embodiment the invention comprises passing a sol or gel forming hydrated oxide of an element onto a rotating atomizing disc, forming droplets by centrifugal action, and providing a drying gas stream to travel in the same direction and at substantially the same speed as the droplets leaving the atomizer plate, such that little if any relative motion exists between the droplets and the gas stream.

The present invention may be employed in the manufacture of catalyst composites which are useful in promoting such hydrocarbon conversion reactions as catalytic cracking catalytic reforming, catalytic dehydrogenation of normally liquid or gaseous hydrocarbons, hydrogen transfer reactions, catalytic polymerization reactions and other conversion reactions.

Silica sols may be obtained, for example, by hydrolysis of silicates such as ethyl orthosilicate or from solutions of alkali metal silicates, particularly sodium silicates, which are ordinarily called "water glass." The sol may be formed by adding a small amount of acid to the silicate.

Alumina sols can be easily prepared by the addition of aluminum amalgam to water or by precipitating hydrated alumina from aluminum salts by the addition of a basic precipitant, washing the precipitate and redissolving the precipitate in weakly ionized acid such as acetic or formic acid. In forming silica-alumina composites, the sols of these materials may be combined prior to the formation of the droplets and the sols set into a hydrogel containing the desired amounts of silica and alumina.

Suspension of gel forming hydrated oxides may be prepared for atomizing by grinding or pulverizing premade quantities of the gel and then hydrating with a suitable weakly ionized acid to form the proper sol mixture.

In hydrocarbon conversion processes employing catalyst to accelerate or direct the desired reaction, it is important for the most efficient utilization of the catalyst to obtain uniform contact between the active catalyst and the hydrocarbon reactants. It is therefore important, particularly in operations wherein the catalyst is in fixed bed relationship to the hydrocarbon reactants within the reaction zone, that packing of the catalyst be substantially uniform throughout the catalyst bed to prevent a variation in pressure drop through the bed. With variations in pressure drop there is a tendency for channeling to occur and a large portion of the catalyst is by-passed, thereby decreasing the efficiency of the catalytic operation.

The most desirable shape for a catalyst particle is a true sphere since this shape will provide exceptionally uniform packing in the reaction zone and eliminate to a large extent any decreases in efficiency due to channeling. Spherically shaped catalyst particles have other advantages which are inherent in their physical shape, for example, there are no sharp edges which will project or wear off during the processing to form fines which would be carried out of the reaction zone and cause plugging or require separation in the equipment following the reaction zone, or increase the catalyst losses extensively.

The spherical catalyst particles are also more efficiently used in either the "fluidized" or moving campact bed types of operation, which are now widely being employed in catalytic cracking, dehydrogenation, and the like. The use of spherical particles will provide a more uniform flow of reactants and a more even distribution of reactants throughout the moving bed of catalyst, this results in a more uniform conversion and a more uniform carbon deposition throughout the catalyst bed. Because of the latter effect the regeneration of the catalyst is simplified to a great extent.

One of the important disadvantages of hydrocarbon processes employing a moving or fluidized catalyst is the production of catalyst fines resulting from attrition and abrasion of the catalyst particles. Spherical catalyst particles are less likely to break under the fluidized conditions and the formation of catalyst fines is substantially reduced and the necessity of employing expensive catalyst recovery systems is eliminated.

Catalytic materials have been manufactured in a variety of methods. Large size spheres or pellets have been made from powder or powders of the desired catalytic constituents by shaping them into form with pilling or pelleting machines to obtain spheres or particles of uniform size. This operation of converting catalyst powders into shaped form entails the use of a large amount of equipment and increases the cost of catalyst preparation appreciably. Other methods of manufacture have made use of spraying or atomizing apparatus to form droplets from which round or spherical particles can be formed. For instance, sols are sprayed just above or directly into a quiescent liquid suspension medium, wherein the droplets of sol set into a firm gel as they pass down through the suspension medium. Sols are also sprayed into open drying tanks where the sol forms into a firm spherical gel as the sol droplets leave the atomizing means and fall into the tank through which air or hot drying gas is passed. However, in nearly all of the present atomizing methods there is a tendency for the droplets of sol to be torn away from the rotating spray disc prematurely by the resistance of the surrounding fluid medium, such that true spherical shapes are not obtained. This is particularly true where the sol is of a rather quick drying or setting type.

In the preferred embodiment of the invention, an improved type of operation is used which comprises passing a sol from a mechanical mixing zone directly adjacent the rotating atomizing plate and providing a drying gas stream to flow tangentially with the sol droplets leaving the atomizing plate. The apparatus, one form of which is shown on the drawing, has a mixing tube inlet to receive fluids, a mechanical mixing zone, a rotating atomizing plate, a fan wheel comprising impeller blades attached to the lower side of the atomizing plate, and a damper adjustment which regulates the amount of gas to be circulated by the fan. A single shaft is used to provide the agitating means in the mixing zone and means for rotating the atomizing plate and the fan wheel.

The accompanying drawing and description thereof will serve to show more clearly the improved manufacturing method and apparatus of the invention.

Figure 1:
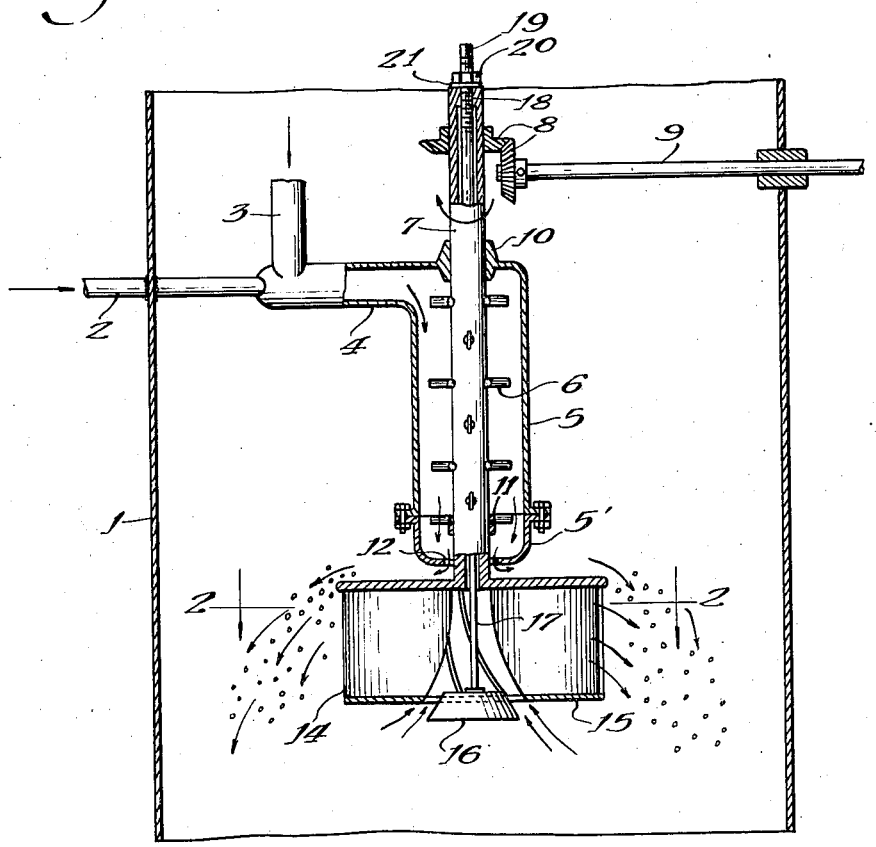
Figure 1 shows an elevational view principally in cross-section of one form of the mixing and spraying apparatus.

Referring now to the drawings, the numeral 1 is shown indicating a chamber wall or housing having the mixing and spraying apparatus mounted therein. Liquids to be mixed and form a gel are fed by way of inlets 2 and 3 into an initial mixing tube 4, which in turn feeds the materials into a secondary mixing chamber 5. In this second mixing chamber 5, having a lower detachable end 5', mechanical mixing and stirring is accomplished by small fins of paddles 6 which project from and are rigidly secured to the rotating shaft 7. The shaft 7 passes entirely through the chamber 5, being turned by means of beveled gears 8 and a power driven shaft 9.

Means other than beveled gears may, of course, be used to turn the shaft 7, and the means for turning shaft 9 may be an electric motor or any other type of prime mover desired. The motivating means is not shown in the drawing.

The end of the mixing chamber 5' is made removable for purposes of easy assembly, being attached to the flange of the housing 5 by means of bolts.

At the ends of the mixing chamber 5, an upper bearing 10 and a lower bearing 11 serve to keep the shaft 7 in proper alignment. The lower bearing 11 is placed at a point inside the chamber in order to have an annular opening 12 around the shaft 7 at the lower end of the chamber head 5' which allows the mixed fluid material to flow evenly on to the rotating disc or plate 13. The plate 13 is built integrally with the shaft 7 or rigidly fastened to the lower end thereof; such, that it may be rotated and serve to atomize or spray by centrifugal action the fluid mixture or sol which is received from the mixing chamber above. The fluid mixture is thrown out tangentially from the edge of plate 13 and forms droplets which enter an air stream from the impeller type of fan blades 14 below the rotating plate 13.

Another advantage of having the lower head 5' removable is that it is possible to easily obtain a different size annular opening 12 around the shaft 7. This opening 12 serves to meter or control the quantity of fluid mixture which flows from the mixing chamber 5. A series of heads 5', having different diameters at the lower opening 12, may be made available for use with the apparatus; thus, the opening size may be changed to suit various types of mixtures or to obtain different quantities of the solution and different particle sizes, as may be desired.

It is also desirable to have a full annular shaped ring of the fluid mixture flow around the shaft 7 to the rotating disc 13, such that a non-splashing and swirling stream of liquid is fed evenly to the entire face of the atomizing disc. Jet types of liquid streams, fed through holes or tubes on to the rotating plate, all have a tendency to splash and cause varying sized droplets.

The size of the droplets or spherical particles which will be formed from a gel forming mixture by the centrifugal action will of course vary with the speed of the plate 13, that is, for a given sol or hydrated mixture the size of the particle will be decreased with increases in the centrifugal force or increases in the rotating speed.

For a given size rotating disc 13 of a particular apparatus, then the centrifugal face and the size of droplets is dependent on the rotating speed. Therefore, means for varying the rate of turning the plate 13 should be provided for in the apparatus such as the use of a suitable variable gear drive, variable pulleys or sheaves, or a variable speed motor.

The fan blades 14 are rigidly attached to the underside of the revolving spray disc 13, and a bottom plate 15 forms an end closure such that a substantially true tangential discharge of drying gas is provided from the impeller blades 14. The drying gas stream will enter the fan centrally through a circular opening provided in the center of the lower plate 15, and around a plug type of damper 16. The adjustable plug damper 16 provides control as to the drying gas capacity of the fan. The plug damper 16 is attached to a rod 17 which is made adjustable from above, at the top of the shaft 7, such that the damper 16 may be lowered or raised and provide, in turn, a greater or lesser amount of gas to enter the fan and be expelled therefrom. In the particular form of the apparatus shown, the shaft 7 is made hollow throughout most of its length being tapped at its upper end for a short length in order to accommodate screw threading 18 on the upper portion of rod 17. At the very top of the rod 17, a square or flattened end 19 is provided such that a wrench or other gripping means may be used to turn the rod 17 through the threaded portion. The nut 20 and lock washer 21 are furnished as a locking means to hold the rod 17 from turning during operation and after proper adjustment of damper 16 has been obtained.

With fan blades 14 being attached directly to the rotating plate 13, a drying gas stream is provided which leaves the unit tangentially and at substantially the same speed as the droplets which leave the plate 13. This concurrently moving gas stream decreases the fluid resistance or static force, which is normally present at the periphery of the rotating plate, and which tends to prematurely tear away the droplets from the edge of the atomizing plate. With the present invention there will be very little if any relative motion, or differential in velocities existing between the particles and the drying stream provided, and under these conditions the droplets will acquire a substantially true spherical form, as if falling freely with little or no flow resistance.

Figure 2:
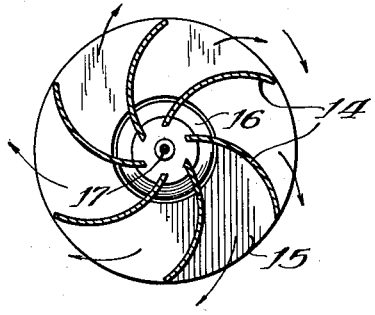
Figure 2 shows a sectional plan view through the fan wheel, at the lower end of the apparatus, as indicated by the line 2—2.

The Figure 2 of the drawing shows a sectional plan view of the impeller type fan blades 14 and the lower end of the apparatus as indicated by the line 2—2 shown in Figure 1. The various parts shown are also numbered to be in accordance with reference numerals attached in the elevational view, Figure 1.

To illustrate further the operation of the apparatus and the manufacture of spherical particles, let it be assumed that silica spheres are to be manufactured, for use as catalyst, from the coagulation of a sodium silicate solution by the addition of a small amount of sulfuric acid to the silicate. Referring again to Figure 1 of the drawing the mixing and spraying apparatus shown is mounted in a tank containing heated air or flue gases. The sodium silicate or "water glass" solution is fed into tube 4 through inlet 3 and the sulfuric acid is fed in through inlet 2, to mix with the silicate solution. The mixture then enters chamber 5 where further mixing is accomplished by the fins or paddles 6 on the shaft 7. The annular opening 12 at the lower end of the chamber head 5' serves to meter or control the flow of the silica sol as it leaves the mixing chamber 5 in a centrifugal spin or whirling manner and flows evenly on to the atomizing plate 13. The centrifugal action of the rapidly rotating plate 13 causes droplets of sol to form and be sprayed out over the edge of the plate 13.

The impeller type of blades 14 of the fan provided below the rotating disc 13 of course travel at the same speed as the disc 13 such that a stream of drying gas moves tangentially outward from the fan blades 14 and the plate 13 at substantially the same velocity as the droplets of silica sol. With this arrangement, the first contact of the droplets falling through space will be with drying gas travelling in the same direction, thereby aiding the particles of hydrogel in acquiring a true spherical form, which obtain an initial set prior to their dropping through the remainder of the drying gas atmosphere within the tank 1 below.

The gas capacity of the fan is controlled by the plug damper 16 which opens and closes the fan inlet opening in the center of the bottom plate 15. As previously described, the adjustment of the damper 16 is made by loosening the lock nut 20 and turning the rod 17 from above, at the end 19.

It is not intended to limit the invention to the apparatus just as shown, for there are various obvious mechanical changes that could be made in the method of operation and in construction. For example, the rotating plate 13 may have a curved upturned edge, or it may have a vertically upturned edge provided with a plurality of orifice holes through which the sol is forced by the centrifugal action. Also, a desirable feature, not shown, that may be incorporated into the apparatus is the use of adjustable blades 14 which can be changed to get coordination between the gas delivery and the sol droplets.

We claim as our invention:

1. A spraying and drying apparatus for forming spherical particles comprising a mixing chamber, a rotary atomizing plate adjacent to said mixing chamber, an outlet from said mixing chamber feeding directly to said rotary plate, fan blades attached to the under side of said atomizing plate, means for rotating said atomizing plate and means for introducing a drying gas axially of said blades.

2. A spraying and drying apparatus for forming spherical particles comprising a mixing chamber, a rotatable shaft extending longitudinally through said chamber, mixing blades attached to said shaft in said chamber, an annular outlet at one end of said chamber around said shaft, a rotatable atomizing plate attached to said shaft and positioned closely adjacent to said annular outlet from said mixing chamber, impeller blades attached to said atomizing plate, a closure plate having an open center portion attached to said impeller blades and forming thereby a rotor type fan wheel, an adjustable damper at the center opening to said closure plate on said fan wheel, and means to rotate said shaft and said attached parts.

3. A spraying and drying apparatus for forming spherical particles comprising a vertically positioned mixing chamber, a hollow rotatable shaft extending longitudinally through said chamber mixing blades attached to said shaft in said mixing chamber, an annular outlet at the lower end of said chamber around said shaft, a rotatable atomizing plate attached to the lower end of said shaft and positioned closely adjacent to said annular outlet from said mixing chamber, a plurality of curved impeller type blades attached below said atomizing plate, a closure plate having a circular center opening attached to the lower sides of said impeller blades forming a rotor type fan wheel, an adjustable plug damper at the center opening to said closure plate on said fan wheel, a rod fixed to said damper at its lower end and passing upward through said hollow rotatable shaft, threaded means to move vertically said rod at the upper end of said shaft and means to rotate said shaft and said attached parts.

4. An apparatus of the class described comprising a housing, a horizontal atomizing plate mounted for rotation in said housing, means for supplying a liquid to the upper surface of said plate, impeller blades attached to the under side of the plate, means for rotating said plate and its attached impeller blades, and means for supplying a drying gas axially of said blades.

5. An apparatus of the class described comprising a mixing chamber, means for supplying liquid to said chamber, a rotatable shaft extending vertically through the mixing chamber, mixing blades secured to the shaft within the chamber, an annular outlet at the lower end of the chamber around said shaft, an atomizing plate mounted on the shaft below said annular outlet, impeller blades attached to the under side of said plate, means for rotating said shaft, and means for supplying a drying gas axially of said impeller blades.

CLARENCE G. GERHOLD.
LEV A. MEKLER.

REFERENCES CITED

The following references are of record in the file of this patent:

UNITED STATES PATENTS

| Number | Name | Date |
|---|---|---|
| 1,294,909 | Howell | Feb. 8, 1919 |
| 1,671,866 | Linville | May 29, 1928 |
| 1,853,682 | Hechenbleikner | Apr. 12, 1932 |
| 2,043,378 | Igarashi | June 9, 1936 |
| 2,152,423 | Von Reis | Mar. 28, 1939 |

FOREIGN PATENTS

| Number | Country | Date |
|---|---|---|
| 422,803 | Germany | Dec. 12, 1925 |